United States Patent [19]

Schulz

[11] Patent Number: 5,125,931
[45] Date of Patent: Jun. 30, 1992

[54] SEWAGE SLUDGE DISPOSAL PROCESS AND APPARATUS

[75] Inventor: Helmut W. Schulz, Harrison, N.Y.

[73] Assignee: Dynecology Incorporated, Harrison, N.Y.

[21] Appl. No.: 587,256

[22] Filed: Sep. 24, 1990

[51] Int. Cl.⁵ .............................. C10L 5/14; C10L 5/46
[52] U.S. Cl. ................................... 44/552; 44/577; 44/578
[58] Field of Search ........................................... 44/552

[56] References Cited

U.S. PATENT DOCUMENTS

| | | | |
|---|---|---|---|
| 4,052,173 | 10/1977 | Schulz | 252/373 |
| 4,152,119 | 5/1979 | Schulz | 44/552 |
| 4,225,457 | 9/1980 | Schulz | 252/373 |
| 4,496,365 | 1/1985 | Lindemann | 44/589 |

Primary Examiner—Prince Willis, Jr.
Assistant Examiner—Jerry D. Johnson
Attorney, Agent, or Firm—Thomas H. Whaley

[57] ABSTRACT

This invention relates to a process for the production of fuel pellets or briquettes from sewage sludge solids. In one of its more specific aspects, this invention relates to a solid pelleted fuel product consisting essentially of sewage sludge solids and caking coal and to its method of preparation. In still another of its specific aspects, this invention relates to a method for the production of fuel gases from sewage sludge solids.

13 Claims, 1 Drawing Sheet

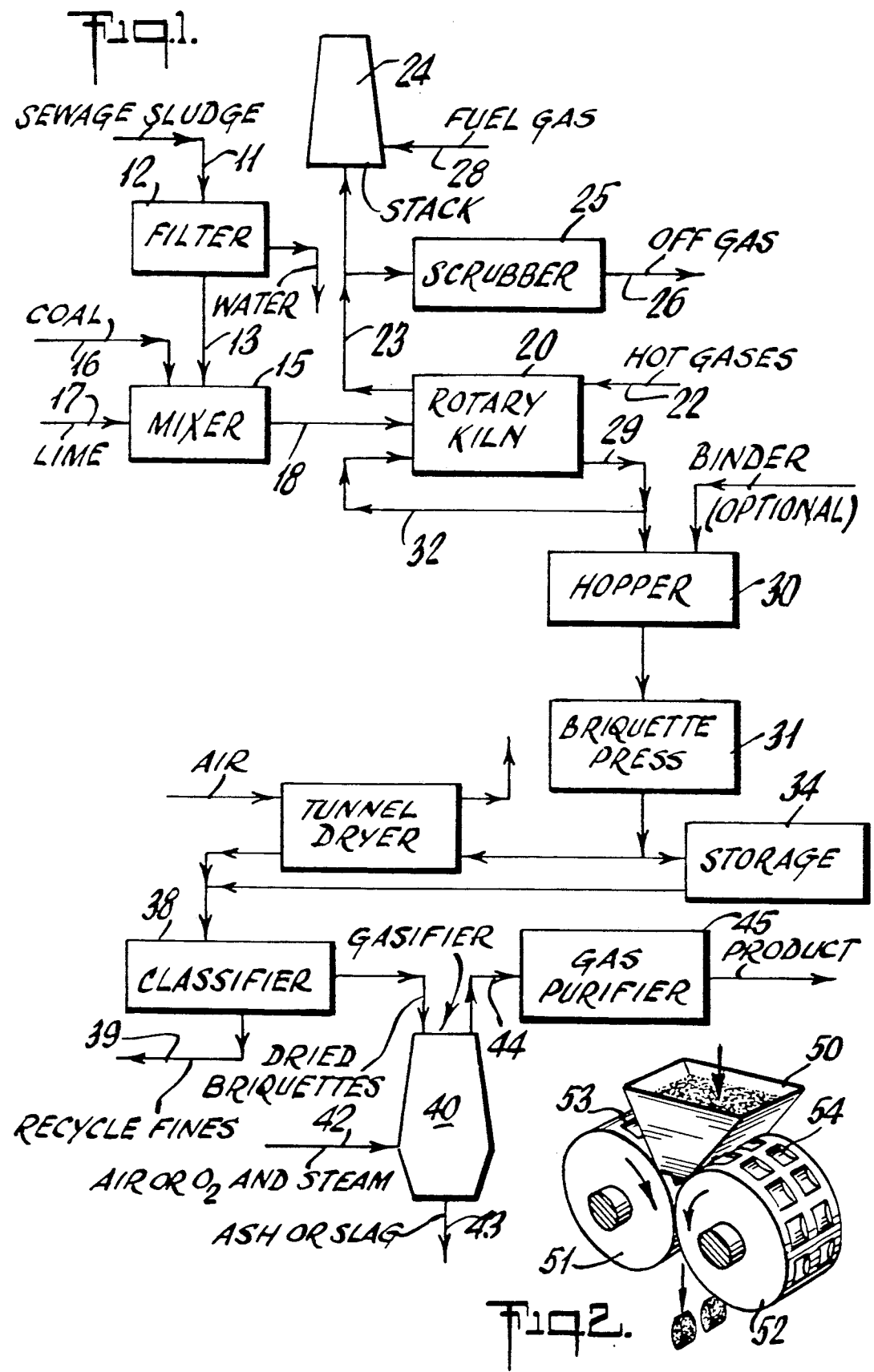

SEWAGE SLUDGE DISPOSAL PROCESS AND APPARATUS

BACKGROUND OF THE INVENTION

Various methods have been disclosed heretofore for the disposal of sewage sludge wastes. For the past several years, it has been customary in areas along the Eastern Seaboard, and particularly in the New York City area, to load sewage sludge into barges which are towed out to sea and dumped into the ocean. Alternative methods of disposal include dewatering the sewage sludge by centrifuges and dumping the dewatered sewage sludge solids in land fill areas. Dumping at sea is becoming more and more restricted as a disposal method while, at the same time, metropolitan areas are rapidly running out of available land fill sites.

Incineration of sewage sludge solids has been proposed but is not an attractive method of disposal due to the water content of moist centrifuged sludges or filter cake solids, which typically contain 65 to 75 percent water after concentration by conventional filtering or centrifuging methods. Also, the presence of toxic heavy metals in metropolitan sewage sludges militates against incineration on two counts: the more volatile heavy metals tend to be discharged into the atmosphere with a large volume of combustion products and excess air, while the less volatile heavy metals are discharged with the leachable incinerator ash whence the toxic heavy metals may eventually leak into the drinking water supply. It has been proposed in U.S. Pat. No. 3,687,646 to Teichmann et al to mix sewage sludge solids with fuel oil and to convert the mixture to useful fuel gas or synthesis gas by reaction with oxygen and steam in a closed reaction zone which is free from packing or catalyst. The reaction is carried out at an autogenous temperature in the range of from about 1800° to about 2600° F. effecting the partial oxidation of the feed mixture to industrially useful fuel gas or synthesis gas.

The art of pressing coal into briquettes is well known. The objective has been principally to utilize coal fines by compacting them into a more easily handled and stored fuel. The compaction or pelleting of municipal refuse together with waste coal products also has been proposed. Jackman in U.S. Pat. No. 3,910,775 disclosed the briquetting of coal including coal fines with organic wastes. In this patent, minor quantities of acidic coal fines are apparently used for the purpose of reducing the pH of a sewage stream filtered through the prepared briquettes so as to precipitate phosphates present in the waste water.

My U.S. Pat. Nos. 4,225,457; 4,152,119 and 4,052,173, which are incorporated herein by reference and made a part hereof, disclose the production of briquettes from sewage sludge and municipal solid wastes and their gasification in a moving bed gasifier. The briquettes are formed from a well blended mixture of sewage sludge, shredded organic solid wastes, especially municipal solid wastes, and crushed caking coal including coal fines. In those patents, dewatered sewage sludge is included in the mixture as a binder to aid in the formation of the briquettes.

SUMMARY OF THE INVENTION

This invention provides a process for forming briquettes from a mixture of caking coal fines and sewage sludge as principal ingredients and for utilization of the briquettes in a process for the generation of industrially useful products, such as hydrogen, synthesis gas, fuel gas, heat and electrical energy.

The process of this invention comprises preparing a composite mixture of crushed or finely divided coal and sewage sludge solids, either before or after drying, adjusting the moisture content of the mixture by drying or adding water, as required, to a moisture content in the range of from about eight to about fifteen percent by weight, and pressing the mixture into pellets or briquettes suitable as fuel. Optionally, lime or dolomite may be included in the composition to reduce noxious emissions and a binder may be included if necessary or desirable to increase the breaking strength of fresh or "green" pellets.

As in the process of my U.S. Pat. Nos. 4,152,119 and 4,225,457, the gasification of sewage sludge by the process of this invention is best carried out in a shaft furnace of the type disclosed in my U.S. Pat. No. 4,052,173 or in a non-slagging moving bed type furnace, e.g. in the well-known Lurgi gasifier, wherein the sewage sludge and coal are partially oxidized to a fuel gas comprising methane, carbon monoxide and hydrogen.

The ratio of hydrogen to carbon monoxide in the product gas from the gasifier may be substantially increased by introducing secondary steam to the High Temperature Reaction Zone, so as to drive the water gas shift reaction to the right: $CO + H_2O \rightleftharpoons H_2 + CO_2$, as previously described in U.S. Pat. No. 4,052,173. This obviates the need for a separate processing step and converter if the product gas is to be employed as a synthesis gas for the production of methanol or methane.

DESCRIPTION OF THE DRAWINGS

FIG. 1 is a diagrammatic illustration of a preferred embodiment of this invention.

FIG. 2 is a simplified perspective view of a typical rotary briquette press suitable for use in the process of this invention.

DETAILED DESCRIPTION OF PROCESS

In the process of this invention, bituminous caking coals which are located in the Eastern United States are preferred as components of the sewage sludge-caking coal briquette. These particular coals are abundant and especially suited for use with the sewage sludge to form the briquettes of this invention. There is a synergistic effect in the combination of these two components which, in themselves, are difficult to handle due to the tendency of caking coals to agglomerate into clumps which tend to clog or ball up in conventional gasifiers. The agglomerating properties of Eastern bituminous caking coals have militated against their use in simple moving bed gasifiers because of their tendency to melt, swell, polymerize and agglomerate when passing through the temperature range from 900° F. to 1300° F. These caking coals are used successfully in the process of this invention by blending sewage sludge solids with crushed caking coal and its associated fines optionally with the addition of hydrated lime and then compacting the mixture into briquettes which are readily handled.

The present invention makes possible the processing of major proportions of crushed caking coal and sewage sludge solids without encountering troublesome bridging, channeling, agglomeration, or cementing of the moving bed of burden in a gasifier.

The feed material is formed into extrusions, briquettes, or pellets of adequate structural integrity to withstand the compressive forces and abrasions experienced in mechanical handling and drying for subsequent use in a shaft furnace without being crushed or reduced to fines that would tend to obstruct the free and rapid movement of gas in a dryer or in a furnace.

These articles of manufacture or briquettes are further characterized by having a minimum acceptable standard of structural integrity, for example, at least sufficient to preserve their cohesive strength until they have gravitated through the Drying and Pyrolysis zones to the High Temperature Reaction and Partial Combustion zones in the process of U.S. Pat. No. 4,052,173.

The present invention is therefore particularly directed to the preparation of shaped articles of manufacture consisting essentially of coal and sewage sludge solids. It has been found that when such articles are prepared in accordance with the present invention, the ratio of highly caking coal to sewage solids may be as high as 2.5:1, but preferably is in the range of 0.5:1 to 2:1 depending on the composition of the sewage sludge, and the degree of comminution and choice of coal. As a general rule, if the ratio of coal to sewage sludge solids is less than about 0.5:1, the pyrolyzed briquettes or pellets are increasingly deficient in the structural integrity needed to sustain the desired high gas production rates in the gasifier.

Preferred sizes and shapes of the briquettes are described in U.S. Pat. No. 4,225,457. As disclosed therein, the shape of the extrusions, briquettes, or pellets may be circular or polygonal (either regular or irregular) in cross-section, and may vary in diameter from about three quarter inch to about six inches or more. Briquettes of similar size may be stamped or pressed in the form of saddles, pillows, hollow cylinders or doughnuts, for example. It has been found that a compaction pressure in excess of 1000 pounds per square inch (psi) in forming the shaped article will give good results. Preferably, the compaction pressure is in the range of 2,000 to 10,000 psi. The upper limit on the compaction pressure is not critical, but as a practical matter, it usually will not exceed 5,000 psi. When employing an extrusion device, it is desirable to equip it with a gate or chopper that will permit the alternation of compaction and extrusion cycles of the ram or augur, so as to permit control of the requisite compaction pressure. In general, a rotating cylinder type press is preferred as illustrated in FIG. 2.

The drying of green briquettes in a shaft furnace requires a considerable amount of residence time in the furnace. The drying time depends on temperature and the size and geometry of the briquette. A cylindrical pellet one inch in diameter by one and one-half inch in length with an initial moisture content of about 12 percent is preferred. When the briquette or pellet is heated in the drying zone from about 70° F. to about 600° F., a strong totally dried pellet is obtained. Much more bulky briquettes, while desirable from a production cost standpoint, require additional residence time for adequate preheating and drying. In general, it is advantageous to employ a pellet or briquette geometry which affords a short route for the diffusion of gases and steam from the pellet or briquette. Hollow cylinders have unusual heat transfer advantages in that they provide a free passage for the ascending hot gasification reactants and pyrolysis products. Other extended surface geometries, such as Berl saddles, would satisfy the same objective, but have lower breaking strengths.

All briquette types can be produced from caking coals and sewage sludge solids, and also from sewage sludge solids with anthracite coals, non-caking bituminous coals, subbituminous coals, lignites or mixtures thereof. When employing non-caking coals however, it is important to employ a binder other than water, such as black strap molasses, bentonite, or black liquor from the paper industry.

The extrusions, briquettes or pellets of the instant invention are specially formulated, designed, and fabricated to serve the functional and operational requirements of a feed material or burden that will enhance the performance of the gasification process described in U.S. Pat. No. 4,225,173. The resultant gaseous product may be cost-effectively scrubbed free of potential air pollutants. When the briquettes are gasified with oxygen, the gaseous product has a heating value of 300 to 400 Btu/SCF and burns with the same flame temperature as natural gas. The gaseous product can be converted to gas of pipeline quality by well-known means. The admixture of two parts of coal per part of sewage sludge alone produces a gas with 4 to 5 times the energy equivalent to that which would be obtained from the sewage sludge alone. At the same time a caking coal, which generally has been considered unsatisfactory for gasification to produce fuel gas or synthesis gas in moving bed gasifiers, is utilized to advantage. This process transforms a pollution problem into an energy resource and at the same time enhances the utility of massive reserves of Eastern caking coal.

Dolomite may be included in the fuel composite to react with and eliminate certain potential pollutants present in the coal and sewage sludge. The amount of lime or dolomite will vary depending on the amount and chemical composition of the gaseous pollutants. Usually, the dolomite is employed in stoichiometric equivalence to the sulfur content of the fuel. The dolomite may be employed either by incorporation in the briquette or it may be added separately as part of the feed material.

The resulting briquettes may be tailored to conform to certain specifications as defined herein. More particularly, the briquettes must be designed and formulated to conform to a number of essential functional requirements. Thus, the green briquettes must retain their mechanical strength while permitting efficient drying in an external dryer or in the drying zone of a moving bed gasifier.

With reference to U.S. Pat. No. 4,052,173, the briquette must also have adequate structural integrity after passing through the Pyrolysis and Coking zone so that the fully-coked briquette will not be crushed by the weight of the super positioned burden or excessively abraded to fines in gravitating to the Partial Combustion zone. It has been found that the strength of the coked briquette is a function of the amount of coal present in the formulation. High ratios of coal to sewage sludge, result in stronger coked briquettes than low ratios. As a practical limit, as stated previously, it was found that coal to sewage sludge solids ratios lower than 1:2 result in briquettes with deficient crushing strength or abrasion resistance.

On the other hand, it has been found that caking coal ratios higher than about 2.5:1 do not afford adequate protection against undesired agglomeration of the charge as it passes into the Pyrolysis and Coking zone.

The coal content is thus seen to function as a tar-like binder material that endows the coked briquette with the desired structural qualities necessary to successfully withstand the attrition of a gravitating bed furnace charge. The sewage sludge solids function as an absorbent "blotter" material that accepts and retains the exuded or condensed tars and oils until they are pyrolyzed by exposure to the higher temperatures of the Pyrolysis and Coking zone.

Another unexpected advantages of the novel briquette formulations employed in the present invention is that they result in a more reactive solid reactant than that represented by coke formed from the same coal.

In one of its specific embodiments, the process for fabricating briquettes or pellets comprises the following steps: a primary dewatering of liquid sewage sludge employing either a centrifuge, a rotary vacuum filter, belt filter, or a plate and frame filter press to produce a cake having a solid content in the range of about 25 to about 40 weight percent or more; mixing said filter cake with the requisite amount of crushed caking coal or caking coal fines; and drying said mixture to a moisture content in the range of from about 11 to about 13 weight percent suitable for pressing into briquettes.

In another embodiment of this invention, the coal fines are added to the liquid sewage sludge to serve as a filter aid during the dewatering operation. The resulting centrifuge cake or filter cake is normally of a higher solids content than those produced in the absence of the added coal fines. The resulting cake is dried in the same manner as described above.

In another embodiment of this invention, the cake produced by either of the procedures described above may be dried to substantial dryness (i.e., 95 weight percent solids or higher), and then mixed with moistened coal to give, upon mixing, the moisture content required for the compaction operation.

The drying operation may be carried out in a rotary kiln type drier having steam-heated vanes or fins, or it may effect drying by direct contact with hot combustion products obtained by burning a portion of the product gas from the gasification process. The liberated steam may be condensed and devolatilization products may be exposed to a secondary heat source such as an after burner or an electric arc as a safeguard against the emission of odorous constituents.

The compaction operation may be carried out either in a conventional pellet mill or in a conventional rotary briquetting press as schematically illustrated in FIG. 2. The application of external heat is not required, but the resulting briquettes or pellets normally emerge steaming hot as a result of the compression forces applied in the compaction process. Although not essential, it is preferred to pass the steaming briquettes or pellets through a drying tunnel, through which ambient or warm air is passed, in order to enhance the structural integrity of the briquettes or pellets. Any fines produced are recovered and recycled to the mixing operation. Alternatively the green briquettes from the press may be permitted to cure by storing them in a dry atmosphere for several days before use.

In another embodiment of this invention, comminuted calcium oxide or calcium hydroxide or dolomite is added to the mixing step that precedes the compaction operation to serve primarily as a fungustat, and as a sulfur getter, if said briquettes are used as a feedstock for combustor or gasifier. For this purpose, the lime constituent may be present in a concentration from 1 to 6 weight percent, but normally a concentration of 2 to 3 percent is preferred.

In a preferred embodiment the blended mixture, adjusted to the desired moisture content, is then compacted into pillow-shaped briquettes in a rotary briquetting press of the type schematically illustrated in FIG. 2.

Throughout this application, the term "sewage sludge" designates the solid components of municipal sanitary sewage including both the raw, undried sludge and the solids residue resulting on drying of the sludge. The term "lignin" as used herein is intended to include those lignin derivatives present in black liquor from the paper industry including lignosulfonates.

The term briquettes is intended to cover the compacted articles of the invention regardless of their shape or size and regardless of the method of compacting. As used in the claims unless otherwise indicated, the term briquettes includes extrusions, pellets, and other shapes which have been subjected to the requisite compacting.

In one of its specific embodiments, the process of this invention comprises preparing a composition comprising crushed or finely divided coal mixed with dried sewage sludge and optionally, comprising molasses, bentonite, or lignins and/or lime or dolomite, and water in the range of 8 to 15 weight percent of the total composition, preferably in the range of 11 to 13 weight percent, and pressing the composition into briquettes or pellets.

DESCRIPTION OF A PREFERRED EMBODIMENT

With reference to FIG. 1 of the drawing, illustrating one preferred embodiment of the present invention, wet sewage sludge containing for example, 80 to 95 weight percent water is supplied through line 11 to a dewatering unit 12, suitably in the form of a vacuum filter which concentrates the sewage sludge solids to a solids concentration in the range of 25 to 40 percent by weight.

Sewage sludge solids from filter 12 are passed through line 13 to a solids mixer 15 where the wet filter cake is mixed with crushed or pulverized coal supplied through line 16. Additives, which may comprise dolomite or lime if required, are introduced into mixer 15 through line 17. After thorough mixing, the composition consisting essentially of coal and sewage sludge solids, is discharged through line 18 to a dryer 20, suitably a rotary kiln as illustrated for the purpose of reducing the water content of the mixture to a moisture content in the range of from about 8 to about 13 percent by weight. It has been discovered that a moisture content in this range produces strong compact pellets or briquettes.

When a rotary kiln dryer is employed as illustrated in FIG. 1, hot combustion gases are supplied to the dryer through line 22. Gases containing steam and water vapor evaporated from the solids in kiln 20 leave the kiln through line 23 and are discharged to stack 24 or to gas scrubber system 25 of conventional design for removal of odors and noxious gases. The cleaned flue gas may be discarded through line 26. Alternatively, gases from line 23 may be discharged to stack 24 where they may be subjected to afterburning with fuel supplied through line 28 to destroy noxious components of the off gas from the kiln.

A mixture of dried sewage sludge and coal is discharged from rotary kiln 20 through line 29 to hopper 30 of briquette press 31. Part of the mixture may be recycled to the kiln 20 through line 32 as an aid in preventing agglomeration of solids in the kiln. Binder, if required, may be added to the mixture of sewage sludge solids and coal in hopper 30 or in a separate mixer (not illustrated). In either event, the moisture content of the composition supplied to the press 31 is controlled within the desired range of from about 8 to about 13 percent, preferably in the range of from about 11 to about 13 percent, water.

The briquettes are formed by pressing the coal and sewage sludge composition in a forming press, preferably a rotary press of the type illustrated diagrammatically in FIG. 2 wherein the composition is formed under pressure, typically in the range of 3000 to 5000 psi. A suitable press is available from Bepex Corporation, Rolling Meadows, Ill.

Briquettes leaving the press are steaming hot from the energy expended in forming them in the press. It is desirable to permit these green briquettes to dry further before use as fuel in a gasifier primarily to permit the briquettes to develop greater mechanical strength. The briquettes may be permitted to dry or season by storing them in piles or bins in a storage facility 34 under normal atmospheric conditions, preferably with protection against further wetting by rain, until ready for use as fuel.

In a preferred embodiment of the process of this invention as described herein, the green briquettes are passed on a conveyor belt (not illustrated) through a tunnel dryer 35 where they are contacted with atmospheric air or heated air from line 36 to further reduce their moisture content. Briquettes from storage facility 34 or from dryer 35 may be sent to a classifier 38 for removal of broken pieces and fines before the briquettes are sent to a gasifier 40. Fines and pieces separated from the briquettes in classifier 38 are recovered as recycle fines at line 39 from which they may be sent to mixer 15 or rotary kiln 18 for return to the briquette press 31.

In the system illustrated in FIG. 1, the air dried briquettes are supplied to a gasifier 40 wherein they are reacted with air or oxygen and steam from line 42 as disclosed in greater detail in U.S. Pat. No. 4,225,173. In that system, the briquettes are gasified with oxygen and steam to produce a fuel gas, synthesis gas or reducing gas comprising carbon monoxide and hydrogen and some methane. In this arrangement, raw product gas from the top of the gasifier passes through line 44 to a gas purification system 45, known per se in the art, to yield the desired product gas. Slag is discharged from the bottom of the gasifier 40 through line 43. Gasification with oxygen permits slagging of the ash which is desirable when the ash contains environmentally objectionable components, such as heavy metal oxides.

An alternative to gasification of the briquettes with oxygen and steam in a slagging type gasifier as above described, is gasification with air in a Lurgi type "dry bottom" gasifier where the hearth temperature or grate temperature is below the melting point of the ash. Air gasification is desirable from an economic standpoint where the relatively low B.t.u. content product gas may be utilized at the gasifier site. The cleaned raw product gas resulting from gasification with air typically has a B.t.u. content of the order of 70 to 80 B.t.u.'s per standard cubic foot. These gases are suitable as feed to a gas fired turbine for the generation of electric power and steam (cogeneration).

Other gasifiers, such as the Welman Galusha type gasifier may be used in the process with gasification at pressures in the range of from about 1 to about 10 atmospheres.

Among the binder materials suitable for use in this process are molasses, bentonite, "black liquor", lignosulfonate, brewery residues and starch wastes.

FIG. 2 illustrates diagrammatically a preferred form of apparatus for producing briquettes from the moist compositions of sewage sludge and caking coal, and from sewage sludge, non-caking coal, and binder. With reference to the figure, a composition comprising coal and sewage sludge of preferred relative proportions is introduced into hopper 50 of a rotary briquette press provided with a matched pair of pressing rolls 51 and 52. Female die elements or pockets 53 and 54 are filled with composition from hopper 50. As the rolls revolve, the pockets 53 in roll 51 mate with corresponding pockets 54 in roll 52 to form a molded briquette of conventional shape.

I claim:

1. A method for the preparation of a fuel briquette which comprises mixing coal with municipal sewage sludge solids in relative proportions of from about 0.5 to about 2 parts by weight coal per part of sewage sludge solids by weight based on the dry weights of the coal and sewage sludge and pressing the resulting mixture at a moisture content in the range of about 8 to about 13 weight percent of the total composition into briquettes at a pressure in the range of from about 1,000 to about 5,000 pounds per square inch.

2. A method according to claim 1 wherein the coal is a bituminous caking coal.

3. A method according to claim 1 wherein the coal is a non-caking coal and the composition also contains from about 3 to about 6 weight percent molasses, bentonite, or lignin as a binder.

4. A method according to claim 1 wherein the mixture of coal and sewage sludge also contains an oxide, hydroxide or carbonate of calcium.

5. A method according to claim 1 wherein said mixture of coal and sewage sludge also contains dolomite.

6. The method as in claims 1 or 2 in which a binder material is added in a concentration ranging from 2 to 6% of the total weight of the feed mixture charged to the briquetting press.

7. A method as in claim 6 in which the binder material is selected from the group consisting of molasses, bentonite, lignosulfonate, brewery residues and starch wastes.

8. A composition of matter consisting essentially of coal and sewage sludge solids in relative proportions of from about 0.5 to about 2 parts finely divided coal per part sewage sludge solids based on the dry weights of the coal and sewage sludge solids in the form of briquettes or pellets.

9. A composition of matter according to claim 8 wherein the composition includes molasses as a binder.

10. A composition of matter according to claim 8 wherein the composition includes lignins as a binder.

11. A composition of matter according to claim 8 wherein the composition includes black liquor as a binder.

12. A composition of matter according to claim 10 wherein the composition includes lime or dolomite.

13. A process for the production of a feed mixture of pulverulent coal and dewatered sewage sludge suitable for production of a fuel gas comprising carbon monoxide, hydrogen and methane by reaction with uncombined oxygen and steam in a moving bed type gasification reactor comprising:

a. mixing sewage sludge having a water content in the range of 80 to 97 weight percent based on the dry weight of the solids with pulverized coal in relative proportions of from about 0.5 to about 2 parts coal per part sewage sludge solids based on the dry weights of coal and sewage sludge solids, b. adjusting the water content of the mixture of coal and sewage sludge solids to produce a composite moisture content in the range of from about 8 to about 15 percent moisture by weight, and c. pressing the mixture of sewage sludge solids and pulverized coal obtained in step b into briquettes at a pressure in the range of 1000 to 10,000 pounds per square inch.

* * * * *